United States Patent [19]

Fought

[11] 4,314,352

[45] Feb. 2, 1982

[54] BANKING MACHINE

[75] Inventor: Harold D. Fought, Dallas, Tex.

[73] Assignee: Docutel Corporation, Dallas, Tex.

[21] Appl. No.: 243,339

[22] Filed: Apr. 12, 1972

[51] Int. Cl.[3] .............................................. G06F 15/30

[52] U.S. Cl. ...................................... 364/900; 235/379

[58] Field of Search ............ 444/1; 340/172.5, 149 A; 235/61.6, 61.78

[56] References Cited

U.S. PATENT DOCUMENTS

| | | | |
|---|---|---|---|
| 3,308,439 | 3/1967 | Tink et al. | 340/172.5 |
| 3,335,407 | 8/1967 | Lange et al. | 340/172.5 |
| 3,407,387 | 10/1968 | Looschen et al. | 340/172.5 X |
| 3,516,068 | 6/1970 | Howard et al. | 340/172.5 |
| 3,566,365 | 2/1971 | Rawson et al. | 340/172.5 |
| 3,588,449 | 6/1971 | Paterson | 235/61.7 B |
| 3,611,293 | 10/1971 | Constable et al. | 340/149 A |
| 3,641,497 | 2/1972 | Constable et al. | 340/149 A |
| 3,648,020 | 3/1972 | Tateisi et al. | 235/61.7 B |
| 3,652,795 | 3/1972 | Wolf et al. | 179/2 DP |
| 3,719,927 | 3/1973 | Michels et al. | 340/149 A |

*Primary Examiner*—Raulfe B. Zache
*Attorney, Agent, or Firm*—Richards, Harris & Medlock

[57] ABSTRACT

A high speed, computer controlled banking machine provides fully automatic teller stations for completing banking functions in response to a coded credit card presented thereto. After the credit card presented to the machine has been initially checked to determine if the card has the proper format, coded information thereon is evaluated to check the user's identity prior to authorizing him to complete a selected banking function. When each of several standard checks of the credit card code have been completed, a check is made of a bank interchange file to determine if the presented card will be honored at a particular station. Upon a satisfactory response at the interchange check, a bad account verification is made to determine if the accounts encoded on the card are delinquent in any respect. For cards showing a good account, the computer advances the system operation to a transaction selection procedure wherein one of four separate banking function selections are made by a push button interface between a user and the system. Following the selection of a correct banking function for the presented card, operation of the system continues to a transaction processing procedure wherein the selected transaction is completed. In the transaction processing procedure, either currency is dispensed, funds deposited to one of several accounts or funds transferred between accounts of the user. Upon completion of any one of these three functions, the system advances to a receipt printing procedure wherein a record of the completed banking function is made. This receipt and the currency, where applicable, are delivered to the user along with his credit card for future use.

38 Claims, 17 Drawing Figures

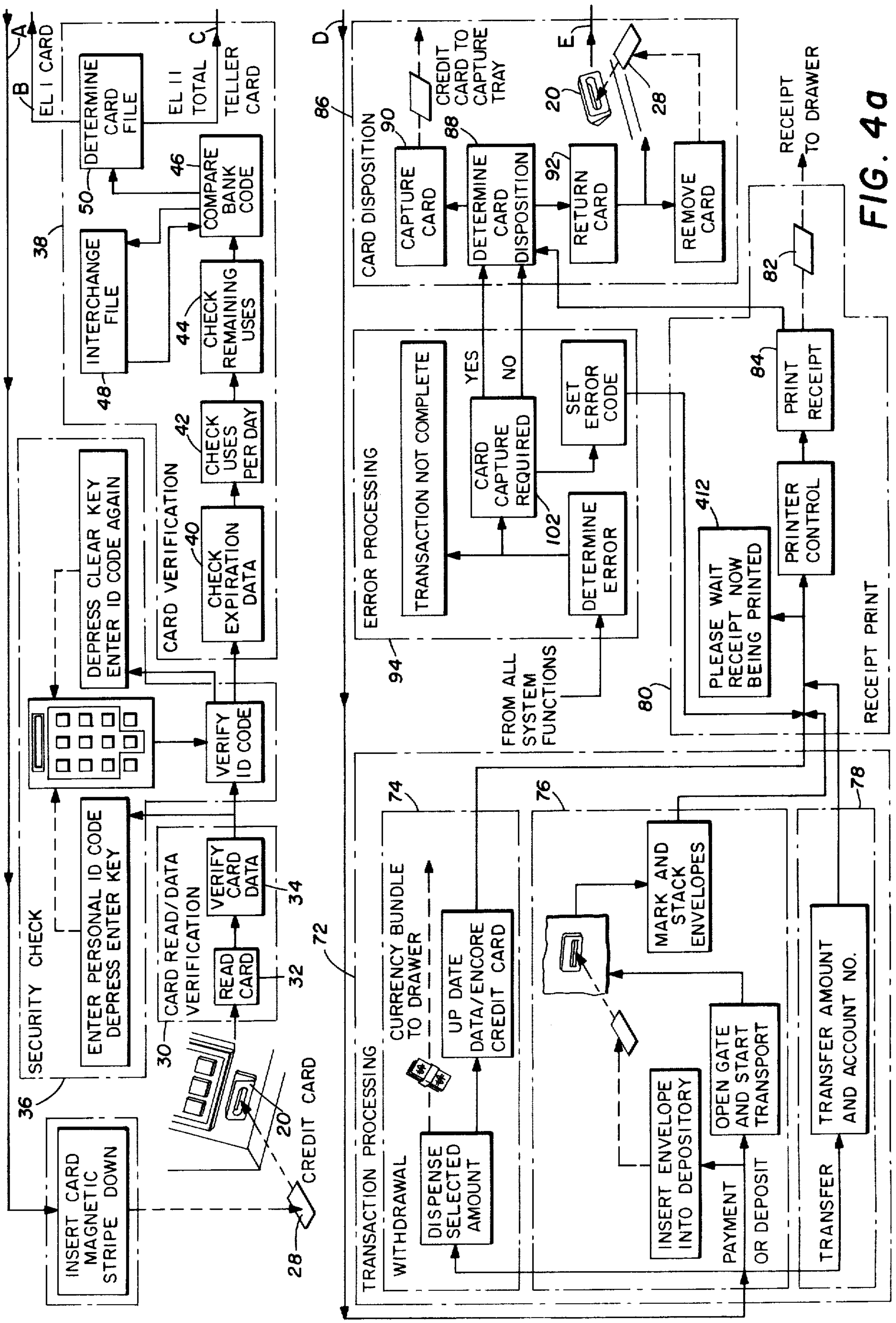
INSERT CARD MAGNETIC STRIPE DOWN
28
CREDIT CARD
20
36
SECURITY CHECK
ENTER PERSONAL ID CODE DEPRESS ENTER KEY
DEPRESS CLEAR KEY ENTER ID CODE AGAIN
30
CARD READ/DATA VERIFICATION
READ CARD
32
VERIFY CARD DATA
34
VERIFY ID CODE
CARD VERIFICATION
CHECK EXPIRATION DATA
40
CHECK USES PER DAY
42
CHECK REMAINING USES
44
INTERCHANGE FILE
48
COMPARE BANK CODE
46
DETERMINE CARD FILE
50
38
EL I CARD
EL II TOTAL
TELLER CARD
A
B
C
D
72
TRANSACTION PROCESSING
WITHDRAWAL
DISPENSE SELECTED AMOUNT
CURRENCY BUNDLE TO DRAWER
UP DATE DATA/ENCORE CREDIT CARD
74
PAYMENT OR DEPOSIT
INSERT ENVELOPE INTO DEPOSITORY
OPEN GATE AND START TRANSPORT
MARK AND STACK ENVELOPES
76
TRANSFER
TRANSFER AMOUNT AND ACCOUNT NO.
78
94
ERROR PROCESSING
TRANSACTION NOT COMPLETE
FROM ALL SYSTEM FUNCTIONS
DETERMINE ERROR
102
CARD CAPTURE REQUIRED
YES
NO
SET ERROR CODE
80
RECEIPT PRINT
PLEASE WAIT RECEIPT NOW BEING PRINTED
412
PRINTER CONTROL
PRINT RECEIPT
84
82
RECEIPT TO DRAWER
86
CARD DISPOSITION
CAPTURE CARD
90
CREDIT CARD TO CAPTURE TRAY
DETERMINE CARD DISPOSITION
88
RETURN CARD
92
REMOVE CARD
E
FIG. 4a

BANKING MACHINE

This invention relates to a banking machine, and more particularly to a coded document actuated banking machine providing teller services.

Recent studies have shown that attempts are being made by the banking community to influence the general public to use fewer checks in their financial transactions and to reduce paper work at in-bank services. This is primarily due to the difficulty of handling and processing large amounts of paper. In its place, there appears to be a wide use of credit cards for completion of daily household and business transactions. A problem which has plagued the financial community with the increased use of credit cards is the unauthorized use of the card due to loss by the owner or theft. This particular problem has been minimized by a scrambling coding technique as described in the patent of Kenneth S. Goldstein and John D. White, Credit Card Automatic Currency Dispenser, U.S. Pat. No. 3,662,343, issued May 9, 1972, and assigned to the assignee of the present invention.

With the risk of unauthorized use now minimized, the banking industry has accepted automatic currency dispensers for unattended distribution of cash to complete some business and personal transactions. This, financial institutions have found, provides customer convenience and eliminates the need for the construction and operation of branch banks which are expensive and unprofitable.

A feature of the present invention is to expand automatic banking from the sole function of cash distribution to a full line of teller services. In addition to a cash withdrawal transaction, machine banking is now provided for deposit transactions, transfer transactions between accounts and payment transactions between accounts or from a deposited payment. All these additional functions are provided with the same security as strictly cash transactions of earlier systems by use of the scrambling coded technique described in the above-referenced patent No. 3,662,343 of Kenneth S. Goldstein, et al.

An automatic banking machine in accordance with the present invention is compatible with standard class "A" credit cards and provides convenience and speed of data processing. By use of an unattended automatic banking station, a customer is not limited to normal banking hours or required to wait on the services of a bank employee to complete teller functions. With use of coded credit cards, the customer is not required to yield his identification with each use. Further, by several banks in a given area cooperating, a customer may complete certain banking functions at a cooperating bank by means of an interchange file stored within the machine. To provide additional security, a bad account file is maintained in the automatic banking machine described herein which is checked prior to completing a transaction on a given credit card.

In accordance with the present invention, a method of machine banking in response to coded data on a document in apparatus including means for reading the coded data, includes the steps of generating a selection signal representing a banking function from a selection consisting of: a withdrawal transaction, a deposit transaction, a transfer transaction and a payment transaction. From the generated selection signal, a processing signal is generated to complete the selected banking function.

More specifically, the withdrawal transaction selection further consists of: withdrawal from a checking account, withdrawal from a credit account, and withdrawal from a savings account. For the deposit transaction selection, this further consists of: depositing to a checking account and depositing to a savings account. The transfer transaction selection further consists of: transferring from a credit account to a savings account, transferring from a credit account to a checking account, and transferring from a savings account to a checking account. In the payment transaction selection, this further consists of: payment from a checking account, payment from a deposited amount, and payment from a savings account.

A more complete understanding of the invention and its advantages will be apparent from the specification and claims and from the accompanying drawings illustrative of the invention.

Referring to the drawings.

Figure 4B:
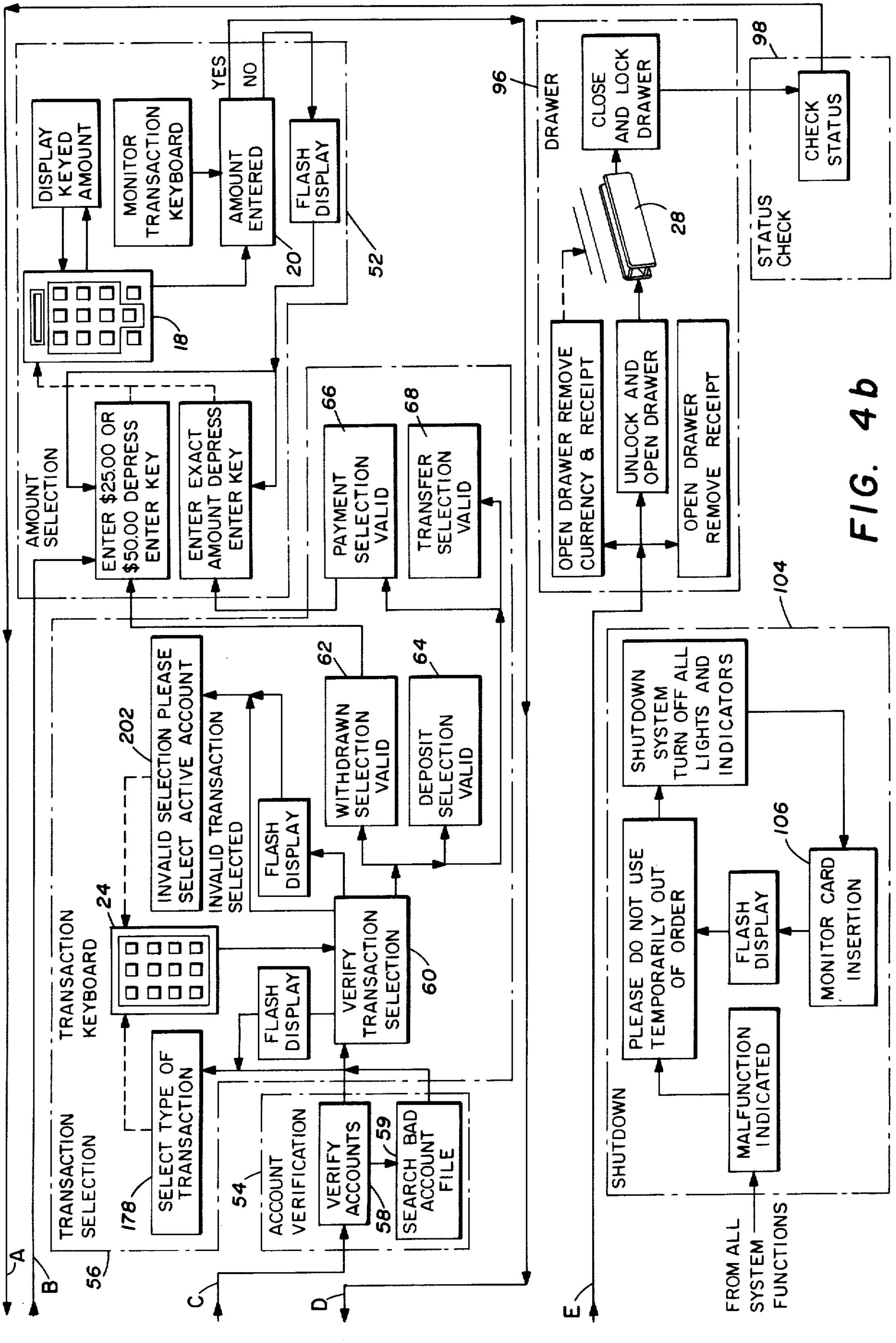
Figure 5:
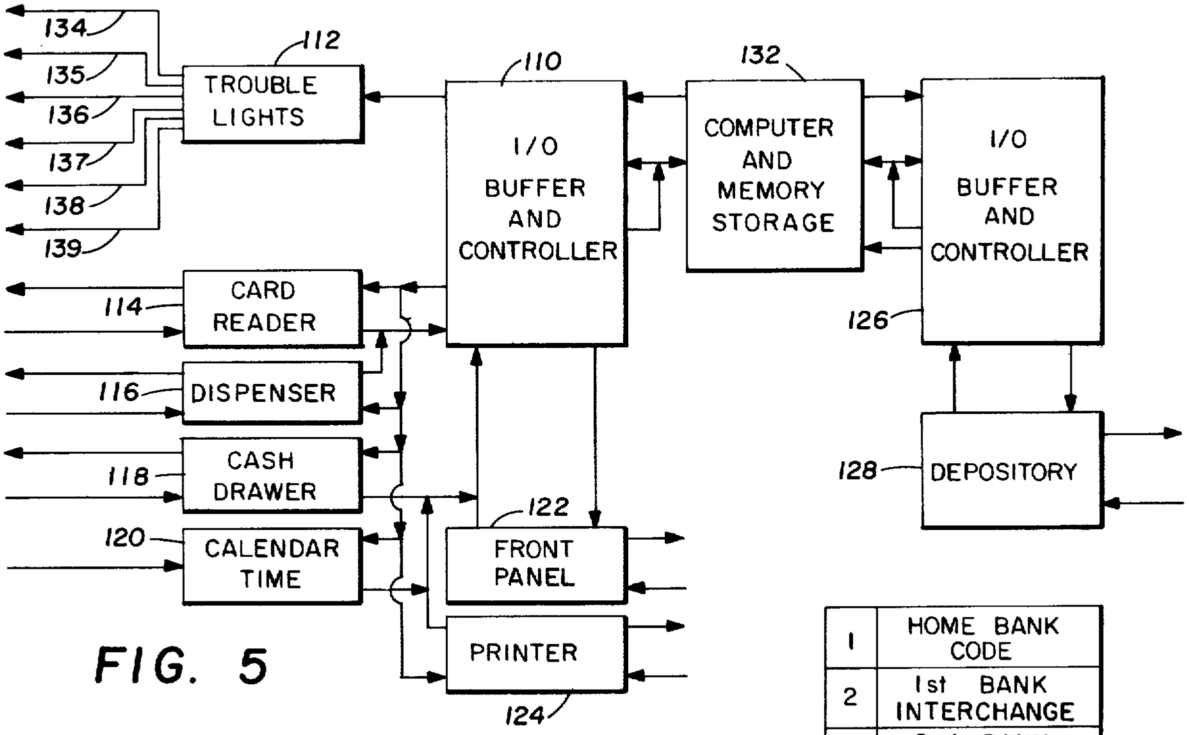
Figure 6B:
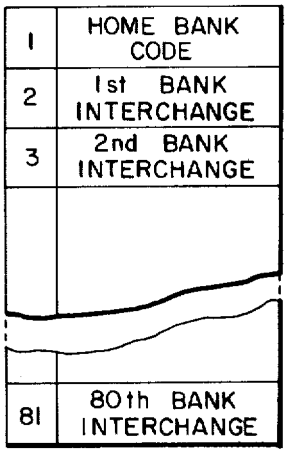
Figure 6A:
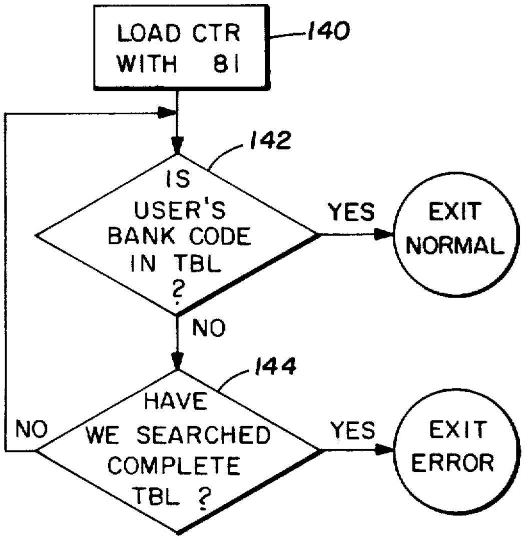
Figure 6C:
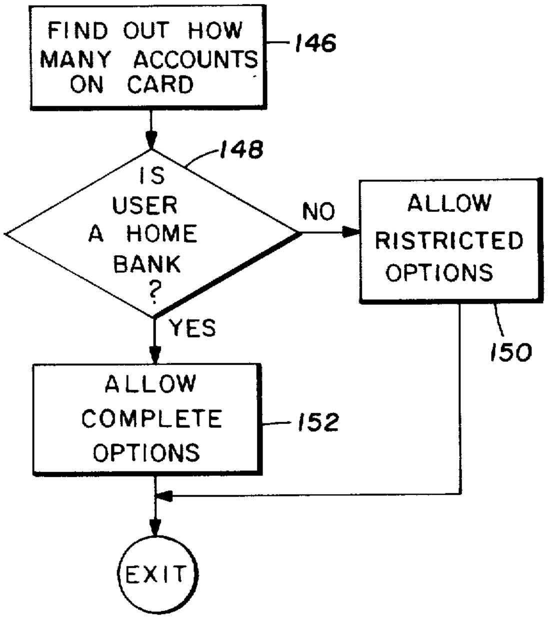
Figure 7:
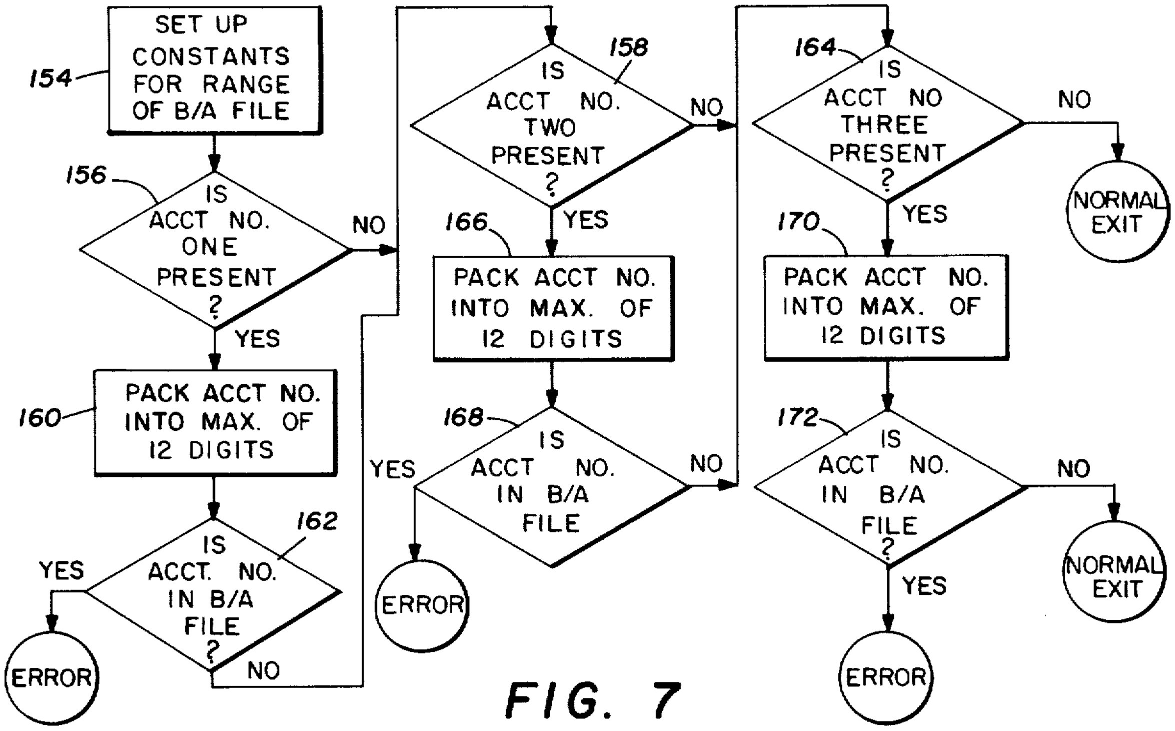
Figure 8A:
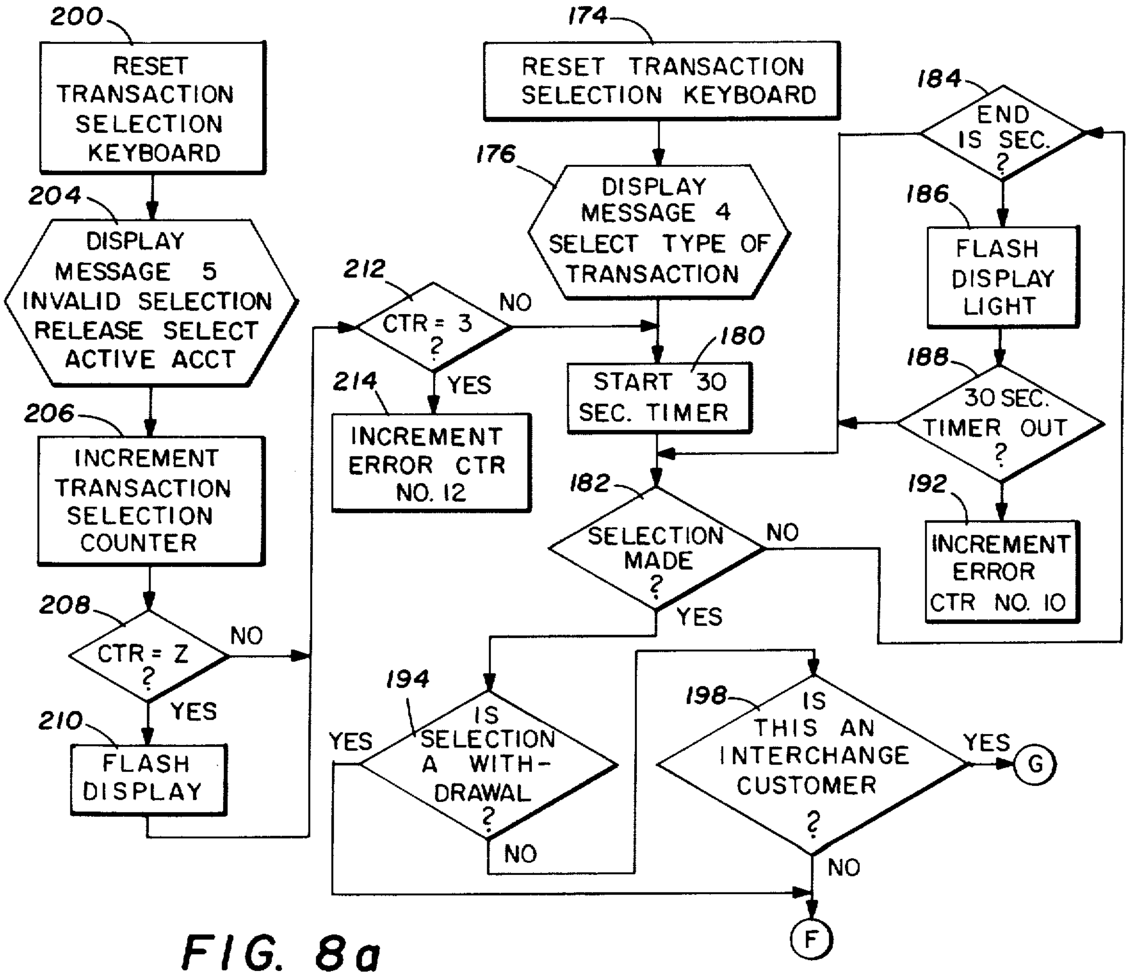
Figure 8B:
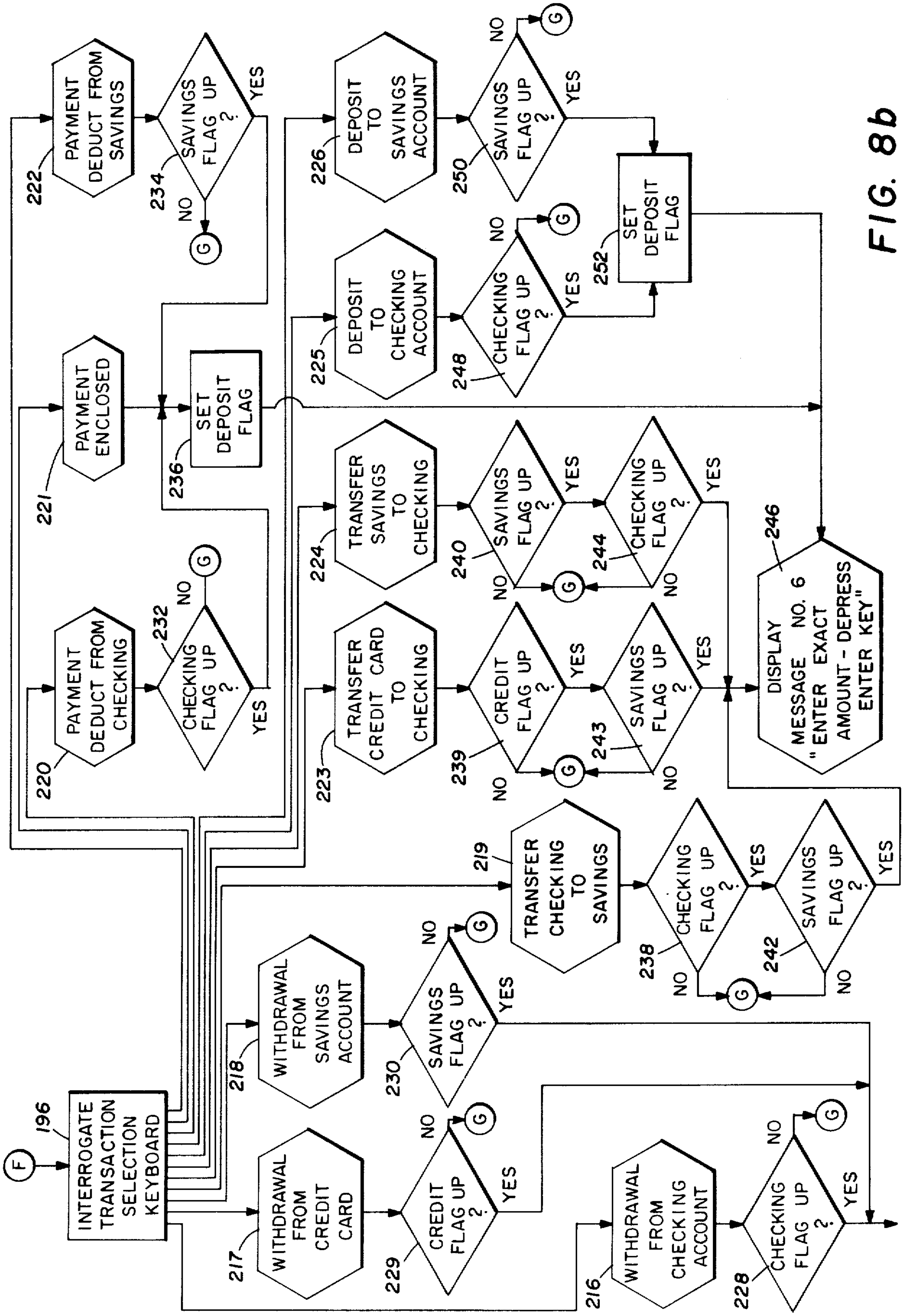
Figure 9A:
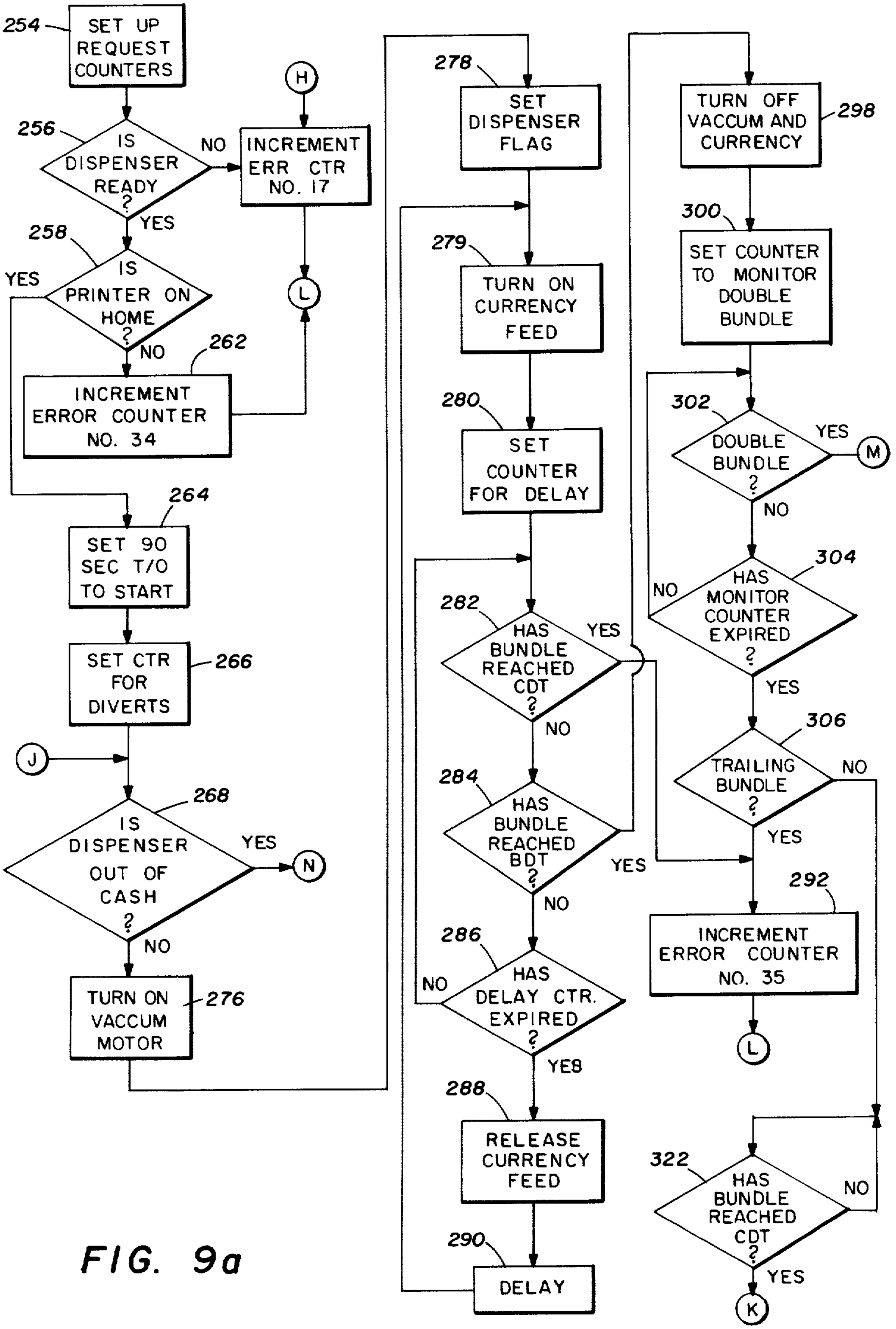
Figure 9B:
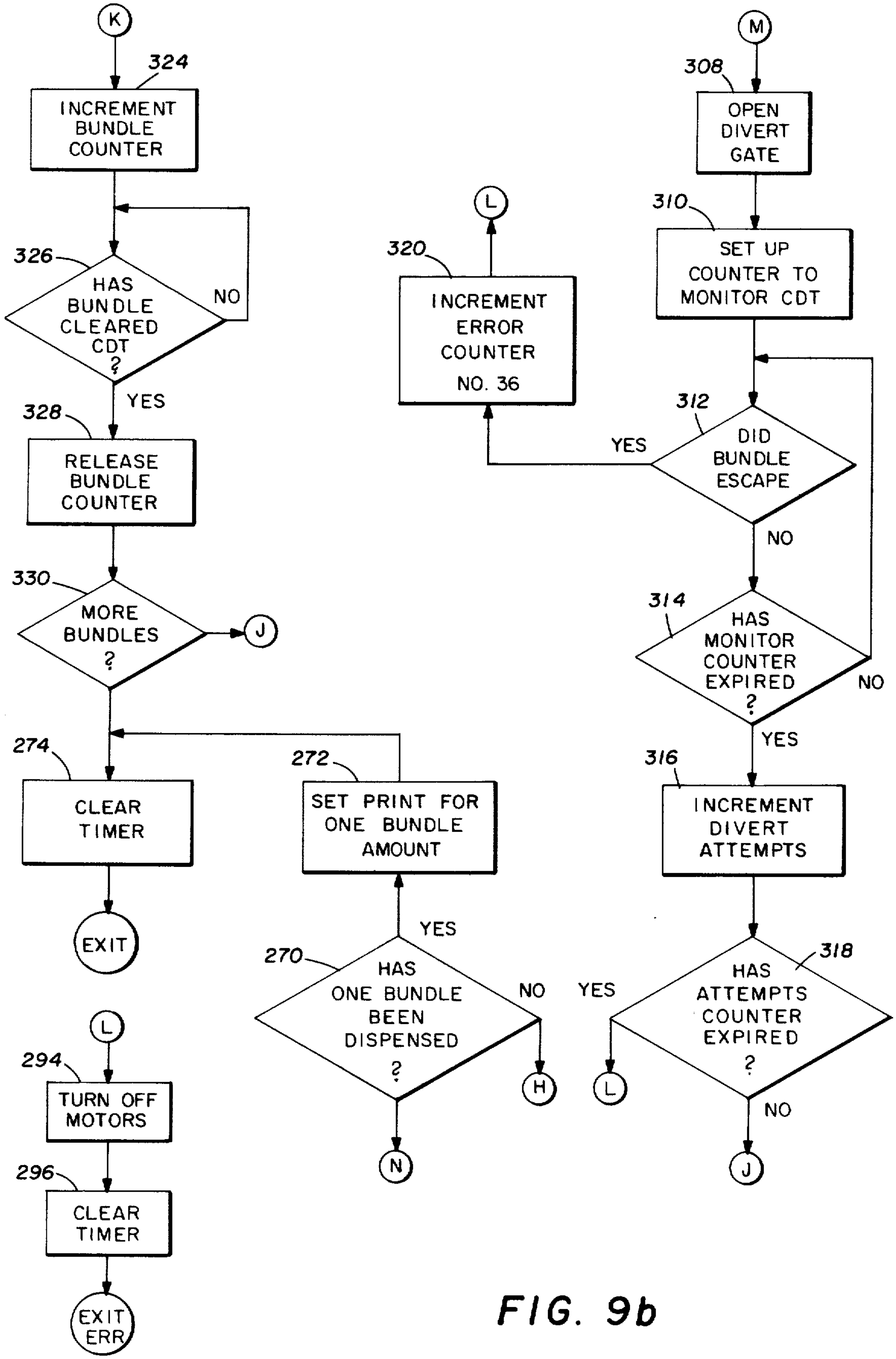
Figure 10A:
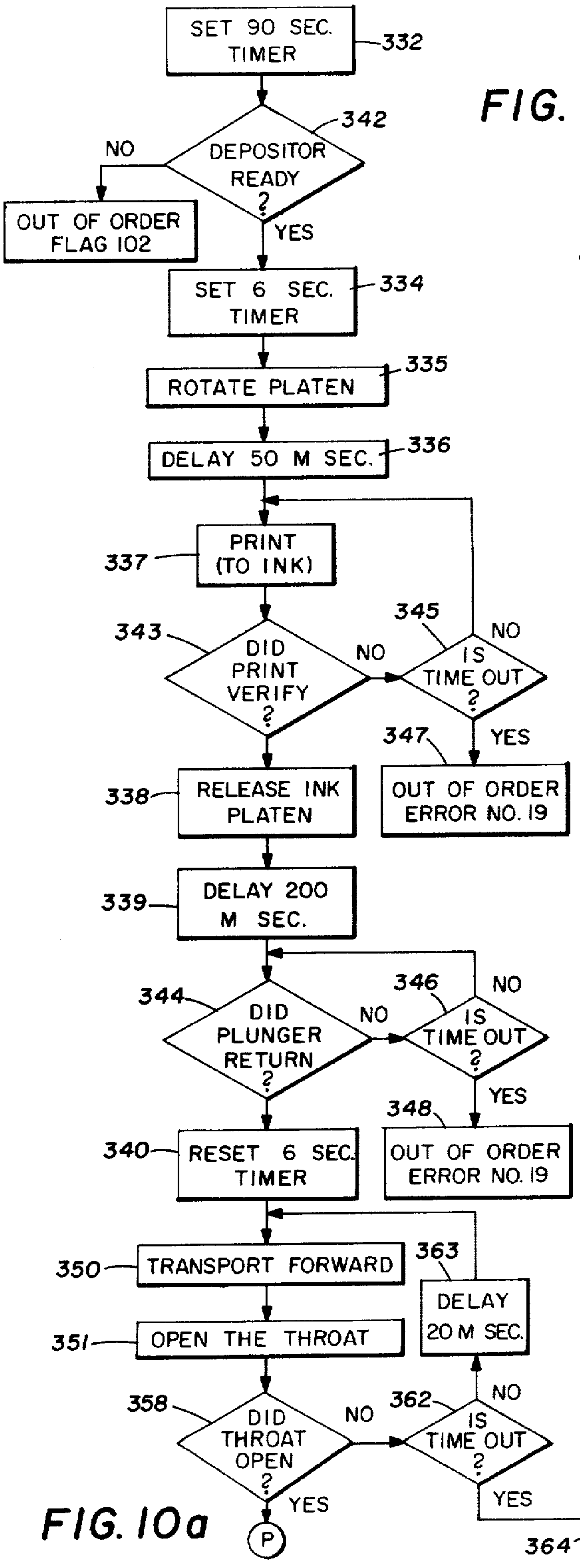
Figure 11:
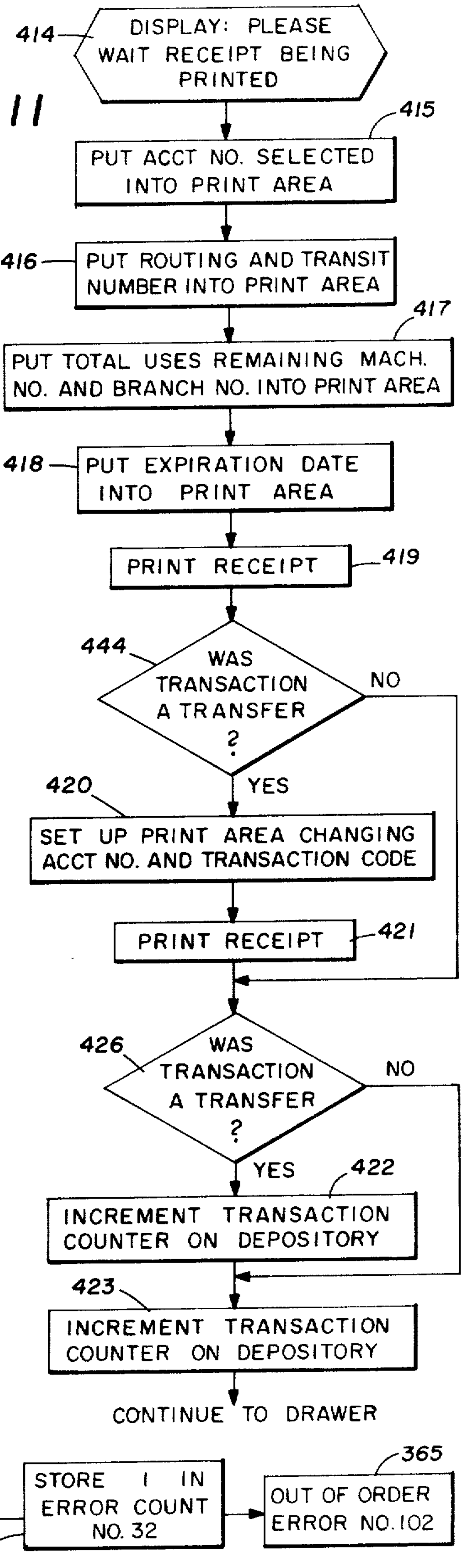
Figure 10B:
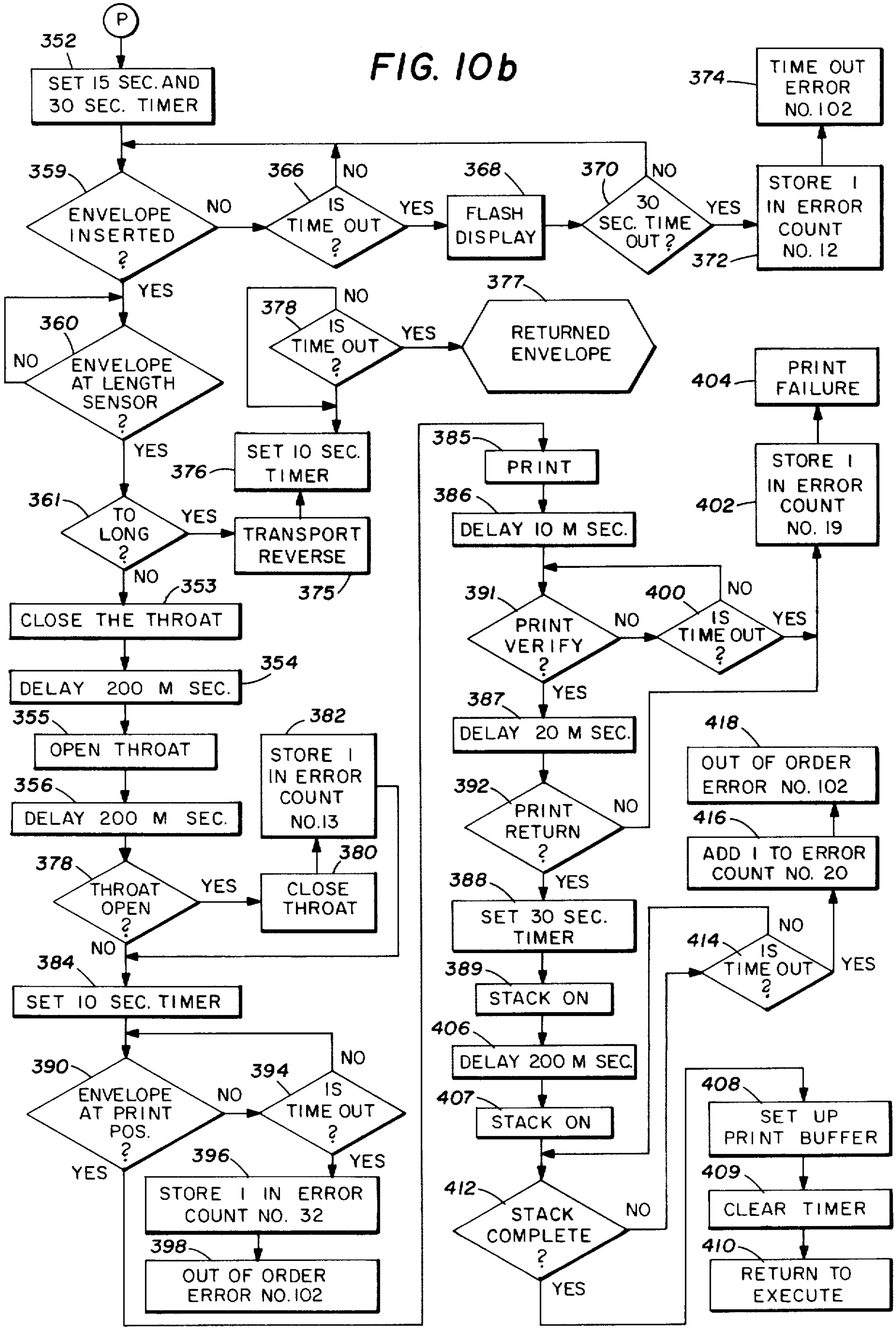

FIGS. 4*a* and 4*b* are block diagram flow charts of an automatic banking system in accordance with the present invention;

FIG. 5 is a block diagram of interface logic and input/output buffer controllers to an automatic computer for system control;

FIGS. 6*a* and 6*c* are detail flow charts of the bank interchange routine in the card verification section of FIG. 4;

FIG. 6*b* is a representation of a bank interchange file;

FIG. 7 is a detail flow chart of the bad account check routine in the account verification section of FIG. 4;

FIGS. 8*a* and 8*b* are an expanded flow chart for the transaction selection routine of an automatic banking machine of the present invention;

FIGS. 9*a* and 9*b* are a detail flow chart of the cash withdrawal processing transaction routine of the process illustrated in FIG. 4;

FIGS. 10*a* and 10*b* are a detail flow chart of the deposit or payment processing transaction routine of the basic flow chart of FIG. 4; and FIG. 11 is a detail flow chart of the transfer processing transaction routine of the automatic banking machine of the present invention.

Figure 1:
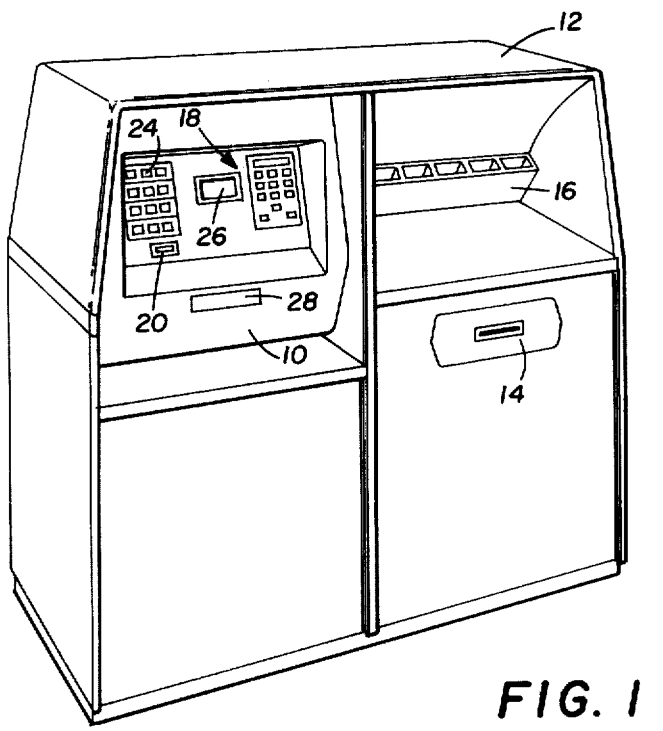
FIG. 1 is a pictorial view of a free standing model of an automatic banking machine including a deposit module.

Referring to FIG. 1, there is shown a free standing automatic banking machine including a console 10 which houses all operating controls and indicators of a currency dispensing mechanism, a card handler, a receipt/voucher printer and necessary power supplies in addition to customer interface equipment. In the free standing unit, the console 10 is mounted within a cabinet 12 which also houses an electronic module containing a computer and necessary interface connections to the console 10. Also housed within the cabinet 12 is a depository module 14 containing an envelope transport, a serial numbering device, envelope stackers and necessary power supplies. A storage rack 16 is positioned within the cabinet 12 above the depository module 14 and provides an area for stationery supplies such as envelopes.

Figure 2:
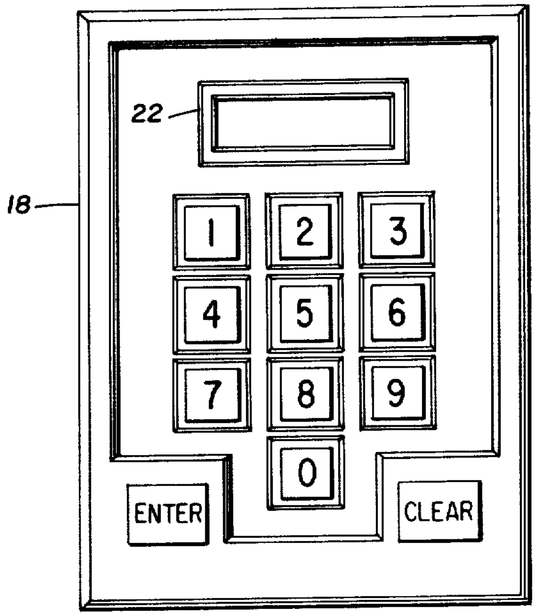
FIG. 2 is a front view of the security/amount keyboard customer interface for automatic banking processing.

On the front panel of the console 10, there is arranged an array of twelve push-button keys in an amount-/security keyboard 18 for use by a customer to interface with the computer of the electronic module. As shown in FIG. 2, ten of these keys, marked 0–9, are to enable a user to insert his assigned identification code for verification of his authority to use a credit card presented to the machine through a card gate 20. In addition, these ten keys, marked 0–9, enable a user to input into the systems the value of the transaction to be completed. Transaction amounts, entered by operation of the push-button keyboard 18 are represented on a numeric display 22, thereby permitting verification of the selected amounts before continuation of the transaction. The numeric display 22 may be one of the type of electronic numeral displays commonly used as indicators of computer operation.

One of the remaining two keys of the group 18 is a "clear" push-button for correcting mistakes made by the user in inserting his assigned identification code or transaction amount. The remaining key is an "entry" push-button for commencing a processing transaction inputed into the machine.

Figure 3:
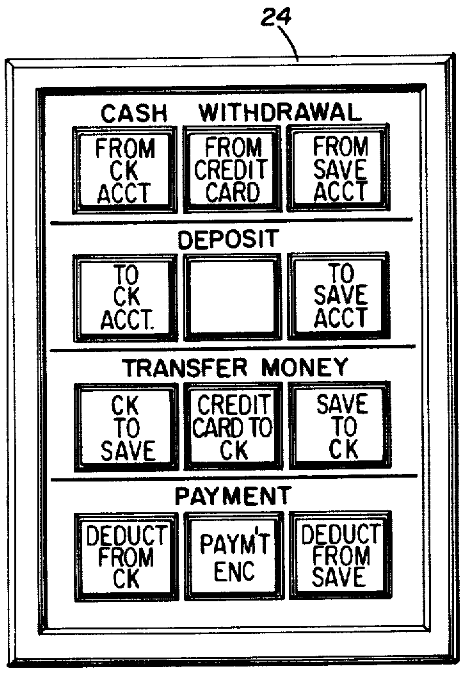
FIG. 3 is a front view of a transaction selection keyboard customer interface for banking function processing.

Referring to FIG. 3, in addition to the push-button keys on the amount/security keyboard 18, the front panel of the console 10 includes a transaction keyboard 24 consisting of twelve push-buttons arranged in sets of three in four rows. The type of banking transaction performed by the banking machine depends upon the transaction key depressed in the keyboard 24. Each key in the four sets on the transaction keyboard 24 represents an independent banking transaction to be processed and completed by the system. The top set of three push-button keys represents cash withdrawal transactions. These transactions consist of a cash withdrawal from a checking account, a cash withdrawal from a credit card account, and a cash withdrawal from a savings account. In the second set of three push-button keys only two represent banking transaction; these are a deposit to a checking account and a deposit to a savings account. The third set of three push-button keys each represent a banking transaction wherein money is transferred between accounts. Included in the three transfer transactions are a transfer from a checking account to a savings account, a transfer from a credit card account to a checking account, and a transfer from a savings account to a checking account. In the last set of three push-button keys, the banking system processes a payment transaction. The payment transaction process consists of a payment deduction from a checking account, a payment by means of a user's deposited amount, and a payment from a savings account.

In addition to the above controls and indicators, the front panel of the console 10 includes an instruction window display 26 that provides for viewing an illuminated display message drum. As will be explained, the messages on this drum instruct a user in the operation of the banking machine. The last user interface on the front panel of the console 10 is a cash drawer 29 that fits flush with the panel in a closed and locked position.

Referring to FIG. 4, upon presentation of a credit card 28 through the card gate 20 to the console 10, it is transported to a plurality of reading stations by a card reader to activate the various systems in a preordered sequence. Typically, a banking machine in accordance with the present invention is activated by a standard "A" size plastic credit card having a stripe of magnetic material located on the backside.

As the credit card 28 moves through the system card reader, data read from the card initially activates a card read/data verification routine 30 wherein the data read from the card is verified as to its quantity and quality. This is a two step process comprising a read subroutine 32 and a data verifying subroutine 34.

A banking system of the type described comprises hard wired logic for interfacing input signals to the system's programmed computer. In the card read/data verification routine of the operating profile, data read from the card during subroutine 32 is verified by a sequence of computer instructions represented by the card data verifying subroutine 34.

Following data verification, the system proceeds to a security check routine 36 that compares two six digit numbers to assure that the user of the system is authorized to make use of the credit card inserted through the entry gate 20. The security check routine 36 of the operating profile makes use of the security/amount keyboard 18, and in particular, the ten push-button keys numbered 0–9. During the security check routine 36, user instructions in blocks 36*a* and 36*b* appear at the instruction window display.

After a security check on the user of the machine, the system proceeds to a card verification routine 38 wherein limits on the use of the credit card 28 are checked. During a transaction, the computer of the electronic module performs the card verification routine 38 to determine if the credit card data is within established limits to assure invalid cards are not accepted. The first verification subroutine 40 determines the credit card expiration date and compares this data to the current calender date. If the expiration date is less than or equal to the calender date, card verification continues, if not, the transaction terminates in a manner to be described. Every credit card is limited to a specific number of daily withdrawal transactions. The second verification subroutine 42 determines if the daily permitted use equals the actual use on the calender date. Credit cards having a daily use limit greater than the actual use as determined by data read from the card are approved for available transactions. Credit cards having a daily use limit equal to an actual use are approved for nonwithdrawal transactions of the system . An individual credit card is also limited to a certain number of withdrawal transactions during a valid period. The third card verification subroutine 44 determines if additional withdrawal transactions are permitted. Cards having remaining use data equaling zero are approved for nonwithdrawal transactions while cards having remaining use data greater than zero are approved for all transactions.

For a more complete description of the security check routine 36 and the card verification subroutines 40, 42 and 44, reference is made to the U.S. Pat. No. 3,761,682 of Thomas R. Barnes, George R. Chastain and Don C. Wetzel, entitled Credit Card Automatic Currency Dispenser, issued Sept. 25, 1973.

The fourth verification subroutine 46 compares the card bank code to the bank code stored in computer memory. To complete the verification subroutine 46, a bank interchange memory 48 is interrogated. In this subroutine the credit card bank code is compared to bank codes listed on the interchange file in computer memory. Should the system fail to make a bank code comparison, the transaction terminates, as to be described. The final verification subroutine 50 determines the type of credit card presented to the system. Credit cards approved for "withdrawal transactions only" proceed immediately to an amount selection routine 52. Credit cards approved for complete banking transactions advance the system operation to an account verification routine 54.

The credit card 28 contains identification data for from one to three accounts; namely, a credit card account, a savings account, and a checking account. In the account verification routine 54, two subroutines are completed; first, a determination of the type of account or accounts included on the credit card is made to enable corresponding transaction subroutines in the transaction selection routine 56. Secondly, in the account verification routine 54, a check is made of the credit card account information to assure each account number is valid. This is completed in an account verifying subroutine 58.

An additional function is also performed at this time. Credit account data and checking account data is compared to delinquent account data listed in a bad account section of computer memory. This check is made during performance of a search bad account file subroutine 60. Should account verification detect an invalid or delinquent account number, the system proceeds to an error processing routine, to be described. If account verification is successfully completed the system proceeds to the transaction selection routine 56.

In the transaction selection routine 56, a user activates one of the transaction push-button keys in the transaction keyboard 24 corresponding to the desired type of banking transaction. After a selection is made, the system determines if the selection is enabled by the card and account verification routines. This transaction verification is completed in a subroutine 60. Upon completion of the subroutine 60, to the satisfaction that a proper transaction has been selected, the routine 56 continues to perform subroutines 62, 64, 66 or 68 depending upon the transaction selected. If either the withdrawal selection subroutine 62 or the payment selection subroutine 66 are completed, system operation advances to the amount selection routine 52. The user employs the security/amount keyboard 18 in conjunction with the numeric display 22 to select either the requested amount or enter the exact transaction amount. After properly inserting the amount, the user activates the "enter" key to activate a subroutine 70 to monitor the keyboard 18. During completion of the amount routine 52, the instructions of blocks **52*a* and 52*b* appear at the window display 26 for user operating guidance. For a more complete description of the amount selection routine 52**, reference is made to the patent of Thomas R. Barnes, et al, U.S. Pat. No. 3,761,682.

After the selection of the transaction amount, the system proceeds to a transaction processing routine 72 that includes one of three possible transaction processing subroutines; a withdrawal subroutine 74, a payment or deposit subroutine 76 or a transfer subroutine 78. If a withdrawal function is selected, the system proceeds by dispensing currency requested during the amount selection. During dispense, the computer of the electronic module monitors several functions to assure the correct currency amount is delivered to the drawer. For a more complete description of currency deliveries to the drawer 28, reference is made to the copending patent application of Marion R. Karecki, George R. Chastain and Thomas R. Barnes, Ser. No. 58,888, filed July 28, 1970, now U.S. Pat. No. 3,685,690, issued on Aug. 22, 1972.

Withdrawal transactions require updating of certain credit card information. After the correct currency amount is dispensed, total use data is then decremented, actual use per day data is incremented, and the credit card is re-encoded with correct information. This is more thoroughly described in the patent of Thomas R. Barnes et al, U.S. Pat. No. 3,761,682.

If a deposit or payment function is selected, the system enters the deposit or payment subroutine 76 after amount selection in the routine 52. In response to a displayed message on the window display 26 as shown in the block **76*a*, a user inserts a prepared deposit envelope into the depository module 14. Envelopes accepted for deposit are positioned under a sequential printer (not shown) that marks the envelope with the current transaction number. After marking, the envelope is transported to a stacker and stored in sequence. If the entry gate of the depository module 14** fails to open for deposit or does not close after an envelope has been accepted, the system proceeds immediately to a shutdown routine, to be described.

If a transfer selection is made in the transaction selection routine 56, the system proceeds to the transfer subroutine 78 after completing the amount selection routine 52. The transfer subroutine 78 establishes parameters of the requested transfer function. Indentification numbers to be debited and credited are determined along with the requested amount of transfer. This data is temporarily stored in computer memory for input to a receipt/voucher routine 80.

A transaction receipt/voucher form 82 is printed during each transaction to provide both the user and the bank a transaction record. A receipt copy of the form is delivered to the drawer 29 and the voucher copy is retained by the system. As the receipt/voucher routine 80 starts, transaction information is correctly formatted and printed on the receipt/voucher form in numeric characters. If the receipt/voucher is printed incorrectly or should the system fail to complete the receipt print routine in the alotted time, the system proceeds to the shutdown routine, to be described.

After completing the receipt print subroutine 84, the system either returns the credit card 28 to the user through the gate 20 or captures the card. This function of the banking system is completed in a card disposition routine 86. Within the card disposition routine 86, there is a subroutine 88 that advances the system to a capture card subroutine 90 or a return card subroutine 92 as determined by output instruction from an error processing routine 94. In a normal transaction, the card 28 is returned while a capture results for certain error conditions. If the credit card 28 is returned, the card handler delivers it to the user through the console panel entry gate 20. In the case of a card capture, card removal is not required and the system proceeds to the drawer routine 96. Disposition of captured cards is more fully explained in the patent of Thomas R. Barnes et al, U.S. Pat. No. 3,761,682.

After completion of the card disposition routine 86, the system enters the drawer routine 96 and automatically opens the drawer 29. In response to a displayed message on the window display 26 (either the message in block **96*a* or block 96*b*), the user fully extends the drawer and retrieves its contents. A more complete description of the operation of the cash drawer 28** is described in the copending patent application of Marion R. Karecki, and Thomas R. Barnes, Credit Card Automatic Currency Dispenser, Ser. No. 59,156, filed July 29, 1970, now U.S. Pat. No. 3,651,986, issued Mar. 28, 1972.

At the completion of each transaction the system exercises a self-check routine 98 to determine if it can continue into another transaction. The self-check routine 98 interrogates the card handler, currency dispenser, printer and depository module to assure each is ready for continued operation. Should the self-check routine determine a transaction cannot be completed, the system proceeds to a shutdown. If all functions are normal, the system returns to a ready condition.

If, during the course of a transaction, an error condition is detected, the system terminates the transaction and proceeds directly to the error processing routine 94. Instructions appear on the window display 26 (see block 94*a*) informing the user of the error condition and the system determines the type of error and credit card disposition in subroutines 100 and 102, respectively. The detected error is converted into an error code and printed on a receipt/voucher form. If card capture is required, the card handler transports the credit card to the capture tray and provides a "yes" instruction from the subroutine 102. If the card capture is not required, the subroutine 102 provides a "no" instruction and the card is returned to the user as explained. After completion of the error processing routine 94, the system proceeds through the drawer routine 90 and the self-check routine 98 as it would in a normal transaction.

During a transaction, the system monitors its own progress. If a malfunction or an abnormal event, jeopardizing system security occurs, the system immediately enters a shutdown routine 104. After shutdown occurs, the system remains in the "out of order" condition until reset. If an attempt is made to perform a transaction on an out of order system, a monitor card insertion subroutine 106 instructs a user by the window display 26 of the inoperable condition.

Each of the routines for completing a banking transaction is completed in response to a computer in the electronics module. Referring to FIG. 5, communications between the computer and the peripherals, such as the card handler, the amount/security keyboard 18 and the transaction keyboard 24 is accomplished by interface logic. The interface logic is divided into eight sections; an input/output buffer and controller 110, trouble lights 112, card reader logic 114, dispenser logic 116, cash drawer logic 118, calendar time logic 120, front panel logic 122 and printer logic 124. In addition, interface logic includes an input/output buffer and controller 126, and depository logic 128.

Communications between a computer 132, properly programmed to complete the routines of FIG. 4, and the peripheral logic occurs over hard wire cabling between the computer and the interface units. In FIG. 5, this is illustrated by wide-line arrows. The cabling consists of four command lines, a general reset line, a command strobe line, a peripheral acknowledge line, eight address lines and sixteen bi-directional data lines. In one embodiment of the present invention, the computer 132 is a model Alpha-16, manufactured by Computer Automation, Inc. A complete and detailed analysis and explanation of interfacing with the computer 132 will be found in a Computer Automation, Inc. Interface Manual titled Alpha-16 Naked Mini I-O Reference Summary, December 1971.

A system activate signal is generated by a magnetic card sensing head located in the card reader at the entry gate 20 by means of insertion of a magnetically coded credit card 28. When the computer 132 senses the activate line is enabled a program begins sending the command and control signals required to control and monitor the transaction and to address the peripherals as they are needed. When a transaction is started, the computer determines that the card reader is ready and the credit card 28 is read and the transaction commences. As the data bits enter the card reader logic 114, they are placed in a four-bit register and applied to a set of four gates. A command is then issued and the data from the card reader logic 114 is transferred into the computer 132 through the input/output buffer and controller 110. The computer 132 then initiates the card read/data verification routine 30, as explained.

At the appropriate time, the front panel interface logic 122 receives commands and the data from the computer 132 for the appropriate user instruction at the window display 26. During completion of the security check routine 36, the computer 132 receives security code data from the keyboard 18 through the front panel logic 122. Also during the routine 36, the computer 132 sends command signals to display the appropriate instructions to the user.

Upon completion of the security check routine 36 by the computer 132, the card verification routine 38 is completed and subsequently the account verification routine 54. When the nature of the transaction admits, the computer 132, during performance of the transaction selection routine 56, sends commands through the input/output buffer controller 110 to the front panel logic 122 for activating the transaction keyboard 24 and the window display 26 for giving the user the appropriate instructions.

Following completion of the routine 56, the computer 132 advances to the amount selection routine 52 and additional instructions are transmitted through the front panel logic 122 to the keyboard 18. The user inserts the amount of the transaction through the keyboard 18 and this data is transmitted through the front panel logic 122 to the computer 132.

As the transaction progresses, the computer 132 advances to the transaction processing routine 72 wherein, under appropriate circumstances, instructions are transmitted through the input/output buffer and controller 110 to the dispenser logic 116. The dispenser logic 116 transmits appropriate control signals to the currency dispenser as described in the patent of Marion R. Karecki et al, U.S. Pat. No. 3,685,690.

After verifying that the correct amount of currency has been delivered from the currency dispenser, the computer 132 transmits commands and data to the cash drawer logic 118 for control of the cash drawer 29.

During the payment or deposit subroutine 76 of the transaction processing routine 72, the computer 132 transmits commands and data through the input/output buffer and controller 126 to the depository logic 128. When the depository logic 128 receives a command from the computer 132 to accept a deposit, the printer logic 124 simultaneously receives instructions to initiate operation of the receipt printer. A transport motor is energized to receive a deposit envelope through the deposit module 14. After the envelope is inserted, it is engaged by four belts in a conventional document transport and transported to a position for printing. Upon positioning of the deposit envelope, the computer initiates the receipt print routine 80 by issuing commands to the printer logic 124. After marking the deposit envelope with a serial number, the computer 132 proceeds with the card disposition routine 86 by appropriate commands to the front panel logic 122 and the card reader logic 114. The former initiates the display of the appropriate instructions to the user and the latter activates the card reader to return the credit card 28 to the user through the entry gate 20.

When an error is detected in the transaction and the computer initiates the error processing routine 94, the computer 132 senses the error and initiates a routine that results in a binary code of the error being placed in a six-bit register. The computer 132 then issues a trouble light address to the trouble light logic 112. The resulting signal clocks a six-bit register having output lines 134–139 for energizing trouble lights individually connected thereto. The register is wired such that it does not change without being clocked and the trouble light remains illuminated until reset by authorized personnel.

In completing the various routines of a banking transaction, the computer 132 completes several subroutines which provide important features of the present invention. Referring to FIGS. 6A, 6B and 6C, there is shown a block diagram illustration of a program for completing the compare bank code subroutine 46. During setup of the banking machine, the computer 132 initiates processing instructions 140 for storing into the interchange file memory 48 data representing interchange banks which will be recognized by the system. During this processing step, the computer 132 receives into memory a code for each of the interchange banks. Each of the bank codes is stored in a separate memory location such as illustrated in FIG. 6C wherein eighty-one bank codes are stored.

In carrying out a specific banking transaction, the subroutine 46 advances from the processing step 140 to an inquiry 142 wherein a decision is made as to whether or not the data read from the card 28 includes a bank code stored in the interchange file memory 48. The inquiry 142 initially checks the first position in the interchange file and if the code read from the card is found in the first memory position, a "yes" decision is made at the inquiry 142 and the program advances to the determine card type subroutine 50. If the user's bank code is not found in the first memory position, the inquiry 142 results in a "no" decision and the program advances to inquiry 144. If any of the eighty-one bank codes in the interchange file memory 48 have not been checked, the inquiry 144 produces a "no" decision and the program returns to inquiry 142. Inquiries 142 and 144 continue to circulate until the inquiry 142 provides a "yes" decision or inquiry 144 provides a "yes" decision. Inquiry 144 provides a positive decision only after all eighty-one of the memory positions have been checked. A "yes" decision from inquiry 144 advances the transaction to the error processing routine 94.

Whenever the program of FIG. 6A provides a "yes" decision from the inquiry 142, the subroutine 50 is initiated as illustrated in FIG. 6B. Initially, the computer 132 issues program instructions to initiate the processing step 146 which searches the read card data to determine the number of accounts coded onto the card 28. Following completion of the processing step 146, the subroutine 50 advances to inquiry 148. Inquiry 148 determines whether the card 28 includes a "home" bank account number or an interchange bank account number. A "no" decision from inquiry 148 advances the routine to the processing step 150 wherein instructions are provided for allowing only restricted transactions; that is, an interchange bank user is restricted to cash withdrawals only.

A "yes" response to the inquiry 148 advances the routine to the processing instruction 152 wherein instructions are provided for complete banking transactions. From either of the processing steps 150 or 152 the computer advances to the account verification routine 54 or to the amount selection routine 52, as explained previously.

Referring to FIG. 7, there is shown a block diagram of the account verification routine 54. Initially the verification routine 54 proceeds to a processing step 154 that includes a group of instructions for establishing constraint for the range of the bad account file 60. The initial inquiry 156 of the routine 54 determines whether the data read from the card 28 contains a first account number, that is, one of the three possible accounts, namely, credit account, savings account, or checking account. A negative response to the inquiry 156 advances the program to an inquiry 158.

A "yes" response to inquiry 156 advances the routine to a processing step 160 wherein instructions are provided by the computer 132 to normalize the code format. For example, assume that the account number is fourteen digits, then the processing step 160 considers only twelve of these digits and packs them into three four-bit computer words. If the account number is less than twelve digits, the processing step 160 again packs the account number into three four-bit computer words with the excess spaces filled in with a preselected filler code.

After completing the processing step 160, the routine 54 advances to the inquiry 162 wherein a review of the bad account file 60 is made. A "yes" response to the inquiry 162 advances the banking transaction to the error processing routine 94. A negative response to the inquiry 162 advances the routine to the inquiry 158.

In the inquiry 158, the routine determines whether data read from the card 28 includes a second account number. A "no" response to the inquiry 158 advances the routine to the inquiry 160. A "yes" response to the inquiry 158 advances the routine to a processing step 166 which is similar to the processing step 160. Here the second account number is packed into three four-bit computer words. Upon completing the processing step 156, the routine advances to the inquiry 168 wherein the second account number is compared to the bad account file 60. A positive response to the inquiry 168 advances the transaction to the error processing routine 94. A negative response to the inquiry 168 advances the routine to the inquiry 164.

Inquiry 164 checks the data read from the card 28 to determine if the third account number is present. A "no" response from the inquiry 164 completes the account verification routine 54 and the computer 132 advances to the transaction selection routine 56. A positive response to the inquiry 164 advances the account verification routine to the processing step 170 which is similar to the processing step 160. In the processing step 170, the third account number is packed into three four-bit computer words and the routine advances to the inquiry 172. Inquiry 172 checks the bad account file 60 for the presence of an entry of the third account number. A negative response to the inquiry 172 advances the transaction to the transaction selection routine 56. A positive response to the inquiry 172 is an indication of an error function and the transaction advances to the error processing routine 94. In either situation, this completes the account verification routine 54.

Referring to FIG. 8, following completion of the account verification routine, the transaction proceeds to the transaction selection routine 56 wherein the initial processing step 174 resets the transaction selection keyboard 24. Upon resetting the keyboard 24, the routine proceeds to a display step 176 which causes the computer 132 to issue instructions to the front panel logic 122 to cause the display of block 178 in FIG. 4 to appear at the window display 26. Continuing, a thirty second timing step 180 commences and the program advances to an inquiry 182 to interrogate the transaction keyboard 24 to determine if the user has made a selection. A negative response to the inquiry 182 advances the program to an inquiry 184 which measures the time elapsed. If the elapsed time is less than fifteen seconds, inquiry 184 responds negatively and the routine returns to inquiry 182.

This circulation of inquiries 182 and 184 continues until a selection is made or at the end of a fifteen second interval. At the timing out of the fifteen second interval, the inquiry 184 provides a "yes" response and the routine advances to the processing step 186 which causes the display of block 178 to be flashed to the user. At this time a thirty second timing inquiry 188 commences. A negative response to the thirty second inquiry 188 returns the routine to inquiry 182 and the operations 182, 184, 186 and 188 continue until a selection has been made or the thirty second timer times out. Upon timing out of the thirty second timer, the inquiry 188 provides a positive response and the program advances to a processing step 190 indicating a system error and the transaction proceeds to the error processing routine 94.

At any time a selection is made, inquiry 182 provides a positive response and the routine advances to an inquiry 194 which determines if the transaction selected is a cash withdrawal. A cash withdrawal selection provides a "yes" response to the inquiry 194 and the program continues to the processing step 196. A negative response to the inquiry 194, indicating that the selection is other than a cash withdrawal, advances the routine to an inquiry 198. If the user is not an interchange customer, the inquiry 198 provides a negative response and the routine advances to the processing step 196. If the user is an interchange customer, the inquiry 198 provides a positive response and the routine advances to a processing step 200 which is similar to the step 174 to reset the transaction keyboard 24.

Initiating the processing step 200 produces commands from the computer 132 to the front panel logic 122 to activate the window display 26 with the message shown in block 202 of FIG. 4. This message is displayed in response to the processing step 204. In this part of the routine, a transaction selection counter is incremented from a processing step 206. Inquiry 208 makes a determination if the selection counter is equal to two. A positive response from the inquiry 208 advances the routine to a processing step 210 to flash the display of block 202. The routine now advances to an inquiry 212 wherein a positive response initiates the processing step 214, an increment error counter. This is another system error and the transaction proceeds to the error processing routine 94.

A negative response to the inquiry 212 returns the routine to the timing step 180. The routine is repeated through the inquiry 198 until an error in the increment counter terminates the transaction or a negative response is produced at the inquiry 198.

With a negative response to the inquiry 198, the routine advances to the processing step 196. This step comprises a group of processing functions that interrogate the transaction keyboard 24. Depending on the user actuated push-button of the keyboard 24, the routine proceeds to one of the processing steps 216–226. If the routine proceeds to either of the processing steps 216–218, the next operation is one of the inquiries 228–230. If the selected transaction has been approved in the account verification routine 54, the appropriate one of the inquiries 228–230 provides a positive response and the banking transaction proceeds to the amount selection routine 52. A negative response from the appropriate one of the inquiries 228–230 returns the routine to the processing step 200 where a recycling commences.

If the routine proceeds to either of the steps 220 or 222 (which comprise the deposit selection subroutine 64), the next operation is one of the inquiries 232 or 234. A positive response to either of these inquiries or completion of the processing step 221 advances the routine to a processing step 236 and then proceeds to the transaction processing routine 72, namely the payment or deposit subroutine 76. A negative response to either of the inquiries 232 or 234 returns the routine to the processing step 200 for recycling of the routine.

Completion of the interrogation processing step 196 then advances the routine to the steps 219, 223 or 224 and then to one of the inquiries 238–240. Each of these transaction selections require two account numbers to be present on the credit card 28. Inquiries 238–240 check to determine if one of the selected accounts appears on the card. A positive response to either of these inquires advances the routine to the appropriate one of the inquiries 242–244. Each of these inquiries is made to determine if the second of the required account numbers appears on the credit card 28. A positive response to either advances the routine to processing step 246 of the amount selection routine 52. A negative response to the inquiries 238–240 or inquiries 242–244 indicates that the user has made an invalid selection and the routine returns to the processing step 200.

Advancement of the routine to the processing steps 225 or 226 produces one of the inquiries 248 or 250. A negative response to either of these inquiries indicates an invalid selection and the routine returns to the processing step 200. A positive response to the inquiries 248 and 250, each of which determines whether the required account number appears on the user's card, advances the routine to the processing step 252 which is a completion of the selection routine 56 and advances the system operation to the processing step 246 of the routine 52.

After completing the amount selection routine 52 which is described in the patent of Thomas R. Barnes et al, U.S. Pat. No. 3,761,682, previously referred to, the system operation advances to the transaction processing routine 72 detailed in FIGS. 9–11. FIG. 9 illustrates in block diagram the program flow chart for the withdrawal subroutine 52. FIG. 10 is a block diagram of the payment or deposit subroutine 76 and FIG. 11 is a block diagram representation of the transfer subroutine 78.

Referring to FIG. 9, the withdrawal subroutine 74 commences with a processing step 254. Initially the subroutine checks the readiness of the cash dispenser and the receipt printer by inquiries 256 and 258. A negative response to either inquiry 256 or 258 initiates processing step 260 or 262, respectively, which is an indication of system error and the processing routine 94 is incremented. A positive response to the inquiry 258 initiates processing steps 264 and 266 and in turn initiates the inquiry 268 to determine if cash is available in the system cash dispenser. A positive response to the inquiry 268 advances the routine to inquiry 270 which advances the system to the processing routine 94 upon a negative response. A positive response to the inquiry 270 causes the routine to proceed to the processing step 272 which in turn sets up a processing step 274.

A negative response to the inquiry 268 initiates commands to the dispenser logic 116 through the operating step 276. Currency bundles are now delivered from the system cash dispenser by completing processing steps 278–280. This advances the routine to the inquiry 282. Inquiries 284 and 286 are incremented upon a positive response to the inquiry 286 and the system proceeds through processing steps 288 and 290.

If inquiry 282 provides a "yes" response, the routine proceeds to the processing step 292 which is an error incrementing step and advances the routine to a processing step 294 for turning off the currency dispenser motors. In turn, the routine advances to the processing step 296 for clearing the system timers. The program then advances to the error processing routine 94.

A positive response to the inquiry 284 advances the routine to the processing step 298 and to the processing step 300 to the inquiry 302. Inquiries 304 and 306 are then completed. A positive response to the inquiry 306 advances the program to the processing step 292 and subsequent processing steps therefrom.

A positive response to the inquiry 302 advances the routine to a processing step 308 and through the processing step 310 to the inquiry 312 and subsequently to the inquiry 314, to the processing step 316 and the inquiry 318. This line of processing steps and inquiries is implemented upon detection of a double bundle situation being delivered from the system cash dispenser. If the inquiry 312 produces a "yes" response, processing step 320 is incremented and the routine proceeds to the processing step 294, as explained previously. A "yes" response to the inquiry 318 also advances the routine to the processing step 294. A negative response to the inquiry 318 returns the routine to the inquiry 268 and the system repeats.

A negative result from the inquiry 306 initiates an inquiry 322 and in turn a processing step 324. This path of the routine indicates a normal cash dispense and proceeds through an inquiry 326, a processing step 328, an inquiry 330 and to the processing step 274. A positive response to the inquiry 330 indicates additional cash bundles are required and the routine returns to inquiry 268. Completion of the clear timer step 274 advances the transaction to the receipt print routine 80.

Referring to FIG. 10, if the transaction selection is a payment or a deposit, the subroutine 76 is implemented which includes a processing step 332 for starting a timer operation. The sequence of processing steps 334–340 and inquiries 342–346 are completed to provide instructions to the printer logic 124 to ready the receipt printer 84. Should the depository portion of the system be out of order, the inquiry 342 provides a negative response and the error processing routine 94 is implemented. The error processing route is also completed if a position response is produced by either of the inquiries 345 or 346. A "yes" response to the inquiry 345 initiates the processing step 347 and a positive response to the inquiry 346 initiates the processing step 348. Both of the processing steps 347 and 348 advance the system to the error processing routine 94.

Completion of the processing step 340 initiates a series of steps and inquiries for receipt of a deposit envelope into the deposit module 14. This sequence includes processing steps 350–356 and inquiries 358–361. If the inquiries 358 and 359 provide a positive response and the inquiry 360 a negative response, a normal operation is indicated and the system proceeds. A negative response to the inquiry 358 initiates an inquiry 362 and processing steps 363–365. Steps 364 and 365 indicate a system error and initiate the error processing routine 94. A negative response to the inquiry 362 initiates the processing step 363 to return the routine to the step 350.

A negative response to the inquiry 359 advances the routine to an inquiry 366 which returns the routine to inquiry 359 upon a negative response. A positive response to the inquiry 366 initiates the processing step 368 and in turn the inquiry 370. A positive result from the inquiry 370 initiates processing steps 372 and 374 which are error processing operations to return the system to the error processing routine 94.

A positive response to the inquiry 361 advances the routine to a series of processing steps 375–377 and an inquiry 378. This produces an instruction to return to the error processing routine 94 and returns the deposit envelope to the user.

Assuming a normal operating procedure, upon completion of the step 356, the payment or deposit routine 76 advances to the decision inquiry 378. A positive response to the inquiry 378 initiates processing steps 380 and 382. Upon completing the step 382 or a negative response to the inquiry 378, the system initiates instructions for the processing step 384. This is the first step for providing storing of the deposit envelope after printing of a transaction serial number. This includes processing steps 385–389 and inquiries 390–392. A positive response to the inquiries 390–392 indicates a normal procedure and the system proceeds. A negative response to the inquiry 390 initiates an inquiry 394 which returns the routine to the inquiry 390 upon a negative response. A positive result indicates an error thereby initiating the processing steps 396 and 398 to advance the system to the error processing routine 94.

A negative response to the inquiry 391 initiates an inquiry 400 which returns the routine to the inquiry 391 upon a negative response. A positive response to the inquiry 400 indicates an error and processing steps 402 and 404 are completed. This again is a system error and the error processing routine 94 is completed. The same result occurs from a negative response at the inquiry 392.

In normal system operation, following the processing step 389, the system proceeds to the processing step 406 and then to processing steps 407–410 and decision inquiry 412. A positive response to the inquiry 412 indicates normal operation and the system proceeds to complete the transaction. A negative response advances the routine 76 to the inquiry 414 which returns the routine to the inquiry 412 upon a negative result. A positive result is another error indication and processing steps 416 and 418 are implemented to initiate the error processing routine 94.

If the user selects a transfer transaction, once the selection has been verified, only transaction receipt printing is required. The transfer subroutine 78 is initiated by instructing the front panel logic 122 to activate the window display 26 to provide the user with the instruction of block 412 of FIG. 4. This is initiated by starting the processing step 414 of FIG. 11. The transfer subroutine 78 includes processing steps 415–423 and inquiries 424 and 426. The thrust of the subroutine 78 is to cause the print receipt 84 to reflect the transfer account number and the transferred amount. Upon completing of the step 423, the receipt 82 is delivered to the drawer 29. This is a completion of the transaction as previously explained.

While only one embodiment of the invention, together with modifications thereof, has been described in detail herein and shown in the accompanying drawings, it will be evident that various further modifications are possible without departing from the scope of the invention.

What is claimed is:

1. A method of machine banking an operator selected banking transaction from a group consisting of: a withdrawal transaction, a deposit transaction, a transfer transaction and a payment transaction by banking apparatus responsive to coded data on a document, the apparatus including means for reading the coded data, means for entering a selected banking transaction and means for entering a transaction amount, comprising the steps of:

generating a document verification signal from coded data read by means for reading, in response to a generated document verification signal and in accordance with the operator selected banking transaction generating one of the following transaction signals: a withdrawal transaction signal, a deposit transaction signal, a transfer transaction signal or a payment transaction signal, in response to a withdrawal transaction signal and a transaction amount from the means for entering, delivering currency in value equal to the transaction amount to the operator at the banking apparatus, in response to a deposit transaction signal and a transaction amount from the means for entering, activating a depository to receive an envelope containing a tendered deposit, in response to a transfer transaction signal and a transaction amount from the means for entering, activating means for recording the transaction amount transferred from one account to a second account, and in response to a payment transaction signal and a transaction amount from the means for entering, activating the depository to receive an envelope containing a tendered payment or activate means for recording a payment from an account.

2. A method of machine banking in response to coded data on a document as set forth in claim 1 wherein the withdrawal transaction signal comprises a signal from the group consisting of: a withdrawal signal from a checking account, a withdrawal signal from a credit account, and a withdrawal signal from a savings account.

3. A method of machine banking in response to coded data on a document as set forth in claim 1 wherein the deposit transaction signal comprises a signal from the group consisting of: a deposit signal to a checking account and a deposit signal to a savings account.

4. A method of machine banking in response to coded data on a document as set forth in claim 1 wherein the transfer transaction signal comprises a signal from the group consisting of: a transfer signal from a checking account to a savings account, a transfer signal from a credit account to a checking account, and a transfer signal from a savings account to a checking account.

5. A method of machine banking in response to coded data on a document as set forth in claim 1 wherein the payment transaction signal comprises a signal from the group consisting of: a payment signal from a checking account, a payment signal from a deposited amount, and a payment signal from a savings account.

6. A method of machine banking in response to coded data on a document as set forth in claim 1 including the step of transporting a deposit envelope into the banking apparatus in response to a deposit transaction signal or a payment transaction signal.

7. A method of machine banking in response to coded data on a document as set forth in claim 1 including the step of printing a transaction receipt displaying the selected transaction and the completion thereof.

8. A method of machine banking an operator selected banking transaction from a group consisting of: a withdrawal transaction, a deposit transaction, a transfer transaction and a payment transaction by banking apparatus responsive to coded data on a document, the apparatus including means for reading the coded data, means for entering a selected banking transaction and means for entering a transaction amount, comprising the steps of:

generating a document verification signal from coded data read by the means for reading, in response to a generated document verification signal and in accordance with the operator selected banking transaction, generating one of the following transaction signals: a withdrawal transaction signal, a deposit transaction signal, a transfer transaction signal or a payment transaction signal, generating an amount signal by the means for entering a transaction amount representing the value of the selected transaction, in response to a withdrawal transaction signal and an amount signal, delivering currency in value equal to the amount signal to the operator at the banking apparatus, in response to a deposit transaction signal and an amount signal, activating a depository to receive an envelope containing a tendered deposit, in response to a transfer transaction signal and an amount signal, activating means for recording the amount signal transferred from one account to a second account, and in response to a payment transaction signal and an amount signal, activating the depository to receive an envelope containing a tendered payment or activate means for recording a payment from an account.

9. A method of machine banking in response to coded data on a document as set forth in claim 8 including the step of transporting a deposit envelope into the banking apparatus in response to a deposit transaction signal or a payment transaction signal.

10. A method of machine banking in response to coded data on a document as set forth in claim 8 including the step of printing a transaction receipt displaying the banking transaction and the completion thereof.

11. A method of machine banking an operator selected banking transaction from a group consisting of: a withdrawal transaction, a deposit transaction, a transfer transaction and a payment transaction by banking apparatus responsive to coded data on a document, the apparatus including means for reading the coded data, means for entering a selected banking transaction and means for entering a transaction amount, comprising the steps of:

in response to coded data read from a document by the means for reading, generating one of the following transaction signals: a withdrawal signal from a checking account, a withdrawal signal from a credit account, a withdrawal signal from a savings account, a deposit signal to a checking account, a deposit signal to a savings account, a transfer signal from a checking account to a savings account, a transfer signal from a savings account to a checking account, a payment signal from a checking account, a payment signal from a deposited amount, or a payment signal from a savings account, in response to any one of the withdrawal transaction signals and a transaction amount from the means for entering, delivering currency in value equal to the transaction amount to the operator at the banking apparatus, in response to any one of the deposit transaction signals and a transaction amount from the means for entering, activating a depository to receive an envelope containing a tendered deposit, in response to any one of the transfer transaction signals and a transaction amount from the means for entering, activating means for recording the transaction amount transferred from one account to a second account, and in response to any one of the payment transaction signals and a transaction amount from the means for entering, activating the depository to receive an envelope containing a tendered payment or activate means for recording a payment from an account, and recording the particular generated transaction signal and the transaction amount.

12. A method of machine banking in response to coded data on a document as set forth in claim 11 including the step of generating an amount signal representing the value of the banking transaction subsequent to generating one of the banking transaction signals.

13. A method of machine banking in response to coded data on a document as set forth in claim 11 including the step of printing a transaction receipt displaying the banking transaction and the completion thereof.

14. A method of machine banking in response to coded data on a document as set forth in claim 11 including the step of transporting a deposit envelope into the banking apparatus in response to one of the deposit transaction signals or the payment transaction signals.

15. A method of machine banking an operator selected banking transaction from a group consisting of: a withdrawal transaction, a deposit transaction, a transfer transaction and a payment transaction by banking apparatus responsive to coded data including bank identification data on a document in banking apparatus including means for reading the coded data, means for entering a selected banking transaction and means for entering a transaction amount, comprising the steps of:

generating a bank identification signal from the bank identification code, comparing the bank identification signal with a file interchange bank identification signal, generating a document verification signal when the generated bank identification signal compares with one of the file identification signals, in response to the generated document verification signal and in accordance with the operator selected banking transaction, generating one of the following transaction signals: a withdrawal transaction signal, a deposit transaction signal, a transfer transaction signal or a payment transaction signal, in response to a withdrawal transaction signal and a transaction amount from the means for entering, delivering currency in value equal to the transaction amount to the operator at the banking apparatus, in response to a deposit transaction signal and a transaction amount from the means for entering, activating a depository to receive an envelope containing a tendered deposit, in response to a transfer transaction signal and a transaction amount from the means for entering, activating means for recording the transaction amount transferred from one account to a second account, and in response to a payment transaction signal and a transaction amount from the means for entering, activating the depository to receive an envelope containing a tendered payment or activate means for recording a payment from an account.

16. A method of machine banking in response to coded data on a document as set forth in claim 15 wherein the withdrawal transaction signal comprises a signal from the group consisting of: a withdrawal signal from a checking account, a withdrawal signal from a credit account, and a withdrawal signal from a savings account.

17. A method of machine banking in response to coded data on a document as set forth in claim 15 wherein the deposit transaction signal comprises a signal from the group consisting of: a deposit signal to a checking account and a deposit signal to a savings account.

18. A method of machine banking in response to coded data on a document as set forth in claim 15 wherein the transfer transaction signal comprises a signal from the group consisting of: a transfer signal from a checking account to a savings account, a transfer signal from a credit account to a checking account, and a transfer signal from a savings account to a checking account.

19. A method of machine banking in response to coded data on a document as set forth in claim 15 wherein the payment transaction signal comprises a signal from the group consisting of: a payment signal from a checking account, a payment signal from a deposit amount, and a payment signal from a savings account.

20. A method of machine banking in response to coded data on a document as set forth in claim 15 including the step of generating an amount signal representing the value of the banking transaction subsequent to generating one of the transaction signals.

21. A method of machine banking in response to coded data on a document as set forth in claim 15 including the step of printing a transaction receipt displaying the banking transaction and the completion thereof.

22. A method of machine banking in response to coded data on a document as set forth in claim 15 including the step of transporting a deposit envelope into the banking apparatus in response to a deposit transaction signal or a payment transaction signal.

23. A method of machine banking an operator selected banking transaction from a group consisting of: a withdrawal transaction, a deposit transaction, a transfer transaction and a payment transaction by banking apparatus responsive to coded data including account data and bank identification data on a document in banking apparatus including means for reading the coded data, means for entering a selected banking transaction and means for entering a transaction amount, comprising the steps of:

generating an account check signal from coded data from the document read by the means for reading, comparing the account check signal with a file account of data signals, generating an account verification signal when the account check signal does not compare with one of the account data signals, in response to a generated account verification signal and in accordance with the operator selected banking transaction, generating one of the following transaction signals: a withdrawal transaction signal, a deposit transaction signal, a transfer transaction signal or a payment transaction signal, in response to a withdrawal transaction signal and a transaction amount from the means for entering, delivering currency in value equal to the transaction amount to the operator at the banking apparatus, in response to a deposit transaction signal and a transaction amount from the means for entering, activating a depository to receive an envelope containing a tendered deposit, in response to a transfer transaction signal and a transaction amount from the means for entering, activating means for recording the transaction amount transferred from one account to a second account, and in response to a payment transaction signal and a transaction amount from the means for entering, activating the depository to receive an envelope containing a tendered payment or activate means for recording a payment from an account.

24. A method of machine banking in response to coded data on a document as set forth in claim 23 including the step of generating a bank identification signal from a bank identification code, comparing the bank identification signal with a file of interchange bank identification signals, and generating a document verification signal when the generated bank identification signal compares with one of the file identification signals.

25. A method of machine banking in response to coded data on a document as set forth in claim 23 including the step of comparing the generated banking transaction signal with the account check signal to verify the banking transaction.

26. A method of machine banking in response to coded data on a document as set forth in claim 23 including the step of printing a transaction receipt displaying the banking transaction and the completion thereof.

27. A method of machine banking in response to coded data on a document as set forth in claim 23 including the step of generating an amount signal representing the value of the banking transaction subsequent to generating one of the transaction signals.

28. A method of machine banking in response to coded data on a document as set forth in claim 23 including the step of transporting a deposit envelope into the banking apparatus in response to a deposit transaction signal or a payment transaction signal.

29. Banking apparatus for machine banking an operator selected banking transaction from a group consisting of: a withdrawal transaction, a deposit transaction, a transfer transaction and a payment transaction in response to coded data on a document, comprising in combination:

means for reading the coded data on an operator presented document, means for verifying the validity of the coded document and generating a document verification signal, means responsive to a generated document verification signal and in accordance with the operator selected banking transaction to generate one of the following transaction signals: a withdrawal transaction signal, a deposit transaction signal, a transfer transaction signal or a payment transaction signal, means for entering the transaction amount representing the value of the selected transaction and generating an amount signal, means responsive to a withdrawal transaction signal and an amount signal to deliver currency in value equal to the amount signal to the operator at a banking apparatus, means responsive to a deposit transaction signal and an amount signal to activate a depository to receive an envelope containing a tendered deposit, means responsive to a transfer transaction signal and an amount signal to activate means for recording the amount signal transferred from one account to a second account, and means responsive to a payment transaction signal and an amount signal to activate the depository to receive an envelope containing a tendered payment or activate means for recording a payment from an account.

30. Banking apparatus responsive to coded data on a document as set forth in claim 29 wherein the means for verifying the validity of the coded document includes:

means for generating account signals from account data on the presented document, means for comparing the account signal with a file of account data signals, and means for generating an account verification signal when the generated account signal does not compare with one of the signals of the file of account data.

31. Banking apparatus responsive to coded data on a document as set forth in claim 30 including means for comparing the generated banking transaction signal with the account signal to verify the banking transaction.

32. Banking apparatus responsive to coded data on a document as set forth in claim 29 wherein said means for verifying the validity of a document includes:

means for generating a bank identification signal from bank identification data on the presented document, means for comparing the bank identification signal with a file of interchange bank identification signals, and means for generating a document verification signal when the generated bank identification signal compares with one of the file identification signals.

33. Banking apparatus responsive to coded data on a document as set forth in claim 29 including transport means for moving a deposit envelope into the banking apparatus in response to a deposit transaction signal or a payment transaction signal.

34. Banking apparatus responsive to coded data on a document as set forth in claim 29 including means for printing a transaction receipt displaying the banking transaction and the completion thereof.

35. Banking apparatus responsive to coded data on a document as set forth in claim 29 including means for generating an amount signal representing the value of the banking transaction.

36. A method of machine banking in accordance with a banking transaction selected by an operator from a group consisting of withdrawal and a deposit, by banking apparatus responsive to coded data on an operator controlled document, which apparatus includes a reader for reading said coded data, first input means for entering a selected one of said transactions and a second input means for entering a transaction amount signal, comprising the steps of:

generating a document verification signal from coded data read by said reader from said document, in response to said document verification signal and in accordance with the operator selected transaction, generating either a withdrawal signal or a deposit signal, and in response to:

i. a withdrawal signal and said amount signal, delivering currency in value equal to said amount to said operator, and ii. a deposit signal and said amount signal, activating a depository to receive an envelope containing a tendered deposit.

37. A method of machine banking in accordance with a banking transaction selected by an operator from a group consisting of withdrawal, deposit or a transfer, by banking apparatus responsive to coded data on an operator controlled document, which apparatus includes a reader for reading said coded data, first input means for entering a selected one of said transactions and second input means for entering a transaction amount signal, comprising the steps of:

generating a document verification signal from coded data read by said reader from said document, in response to said document verification signal and in accordance with the operator selected transaction, generating either a withdrawal signal, a deposit signal, or a transfer signal, in response to:

i. a withdrawal signal and said amount signal, delivering currency in value equal to said amount to said operator, ii. a deposit signal and said amount signal, activating a depository to receive an envelope containing a tendered deposit, and iii. a transfer signal and said amount signal, activating means for recording the amount transferred from one account to a second account.

38. A method of machine banking in accordance with a banking transaction selected by an operator from a group consisting of withdrawal, deposit, transfer and payment transactions by banking apparatus responsive to coded data on an operator controlled document which apparatus includes a reader for reading said coded data, first input means for entering a selected one of said transactions and second input means for entering a transaction amount signal, comprising the steps of:

generating a document verification signal from coded data read by said reader from said document, in response to said document verification signal and in accordance with the operator selected transaction, generating either a withdrawal signal, a deposit signal, a transfer signal or a payment signals, and in response to:

i. a withdrawal signal and said amount signal, delivering currency in value equal to said amount to said operator, ii. a deposit signal and said amount signal, activating a depository to receive an envelope containing a tendered deposit, iii. a transfer signal and said amount signal, activating means for recording the amount transferred from one account to a second account, and iv. a payment signal and said amount signal, activating the depository to receive an envelope containing a tendered payment or activate means for recording a payment from an account.

* * * * *